Figure 1:
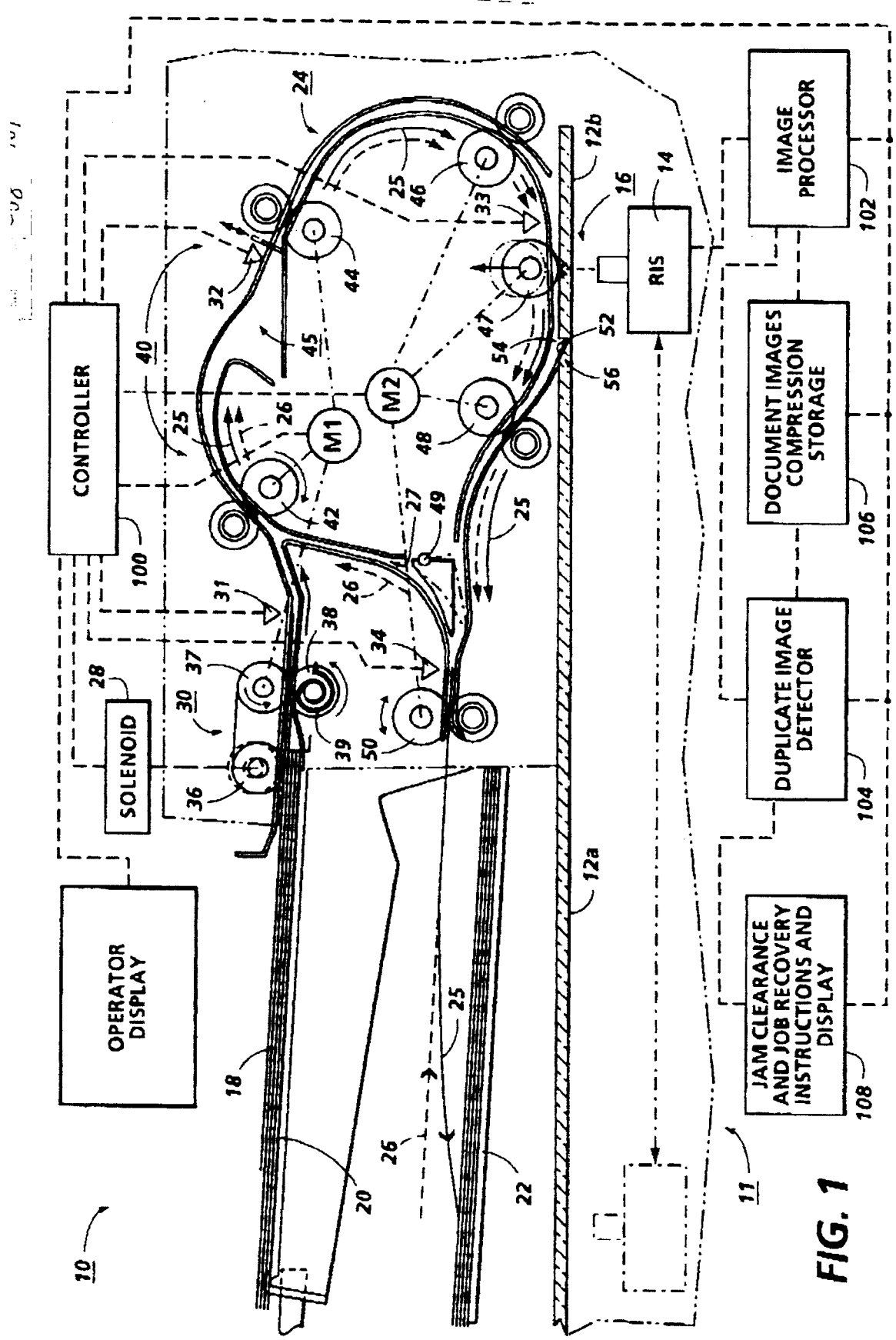

United States Patent [19]
Beikirch et al.

[11] Patent Number: 5,532,839
[45] Date of Patent: Jul. 2, 1996

[54] SIMPLIFIED DOCUMENT HANDLER JOB RECOVERY SYSTEM WITH REDUCED MEMORY DUPLICATE SCANNED IMAGE DETECTION

[75] Inventors: Thomas R. Beikirch, Webster; Margaret C. Plain, Rochester, both of N.Y.

[73] Assignee: Xerox Corporation, Stamford, Conn.

[21] Appl. No.: 334,994

[22] Filed: Oct. 7, 1994

[51] Int. Cl.[6] .............................. H04N 1/00; H04N 1/04
[52] U.S. Cl. .................... 358/401; 358/498; 271/209; 382/305; 382/306
[58] Field of Search .................................. 358/401, 498, 358/296; 271/209; 355/204, 205, 206, 207, 208, 314, 313; 382/194, 318, 319, 305, 306; H04N 1/00, 1/04

[56] References Cited

U.S. PATENT DOCUMENTS

| | | | |
|---|---|---|---|
| 4,208,652 | 6/1980 | Marshall | 340/146.3 |
| 4,218,673 | 8/1980 | Yoshida | 340/146.3 |
| 4,295,120 | 10/1981 | Yoshida | 340/146.3 |
| 4,338,023 | 7/1982 | McGibbon | 355/14 |
| 4,783,827 | 11/1988 | Izumi | 382/18 |
| 4,786,041 | 11/1988 | Acquaviva et al. | 271/3.1 |
| 5,107,299 | 4/1992 | Farrell et al. | 355/207 |
| 5,148,286 | 9/1992 | Knodt et al. | 358/296 |
| 5,365,349 | 11/1994 | Knodt et al. | 358/406 |

OTHER PUBLICATIONS

Research Disclosure, H330, Oct. 1, 1991, pp. 801–810, Emsworth, GB XP 000265056, "Digital Copying Device with Recirculating Original Document Facility".

*Primary Examiner*—Edward L. Coles, Sr.
*Assistant Examiner*—Kimberly A. Williams

[57] ABSTRACT

In a digital imaging document handling system for sequentially feeding plural document sheets in a document feeding path from a document input to an electronic imaging station, wherein document sheet feeding stoppages in the document feeding path are detectable, a simplified job recovery system is provided by providing a duplicate image detection system for the automatic deletion of duplicate electronic document page images. The duplicate page images may be detected efficiently without full image comparisons by checksumming the pixels of multiple cell areas for the page, deleting the least significant figures, and comparing the respective cell checksums. In response to a sheet feeding stoppage signal instructions may be displayed for simply removing the document sheets in the document feeding path and reloading them into the document input irrespective of whether or not the removed document sheets have already been electronically imaged, and refeeding all the removed document sheets path from the document input to the electronic imaging station to be electronically imaged.

6 Claims, 1 Drawing Sheet

SIMPLIFIED DOCUMENT HANDLER JOB RECOVERY SYSTEM WITH REDUCED MEMORY DUPLICATE SCANNED IMAGE DETECTION

There are disclosed herein improvements in automatically feeding documents for electronic document imaging including simplified operator instructions and actions for job recovery in the event of document misfeeds or jams and a more efficient automatic electronic system of identifying duplicate electronic document imagings which does not require pixel-by-pixel page image comparisons.

There is disclosed in the exemplary embodiment herein a system and method to reduce or eliminate operator recovery actions and errors in the event of a document handler jam or other stoppage in a digital document imaging system which has automatic feeding of document sheets being electronically imaged. The disclosed system employs a system of electronically recognizing duplicate electronic images of documents which have already been scanned in or otherwise digitally imaged, by a duplicate imaging detection system, to allow automatically eliminating of inadvertent or unintended duplicate electronic images. This disclosed system greatly simplifies manual document set reordering for re-scanning, and thus increases productivity and operator simplicity. The disclosed duplicate electronic images detection system does not require full image page comparisons which would require increased buffers and additional memory and computer time for electronic retrieval and comparison of the electronic pages.

Although not limited thereto, this disclosed system is particularly useful for digital multifunctional machines providing convenience or walk-up digital copying or facsimile transmission of plural physical document sheet sets as well as electronic image scanning thereof for PC terminal or other electronic processing, and/or remote networking and/or transmitted printing.

Document set job recovery with set integrity is a critical issue in document handlers (DH), otherwise known as "original" document feeders. If job recovery is not done fully correctly, it will result in scrambled or uncollated copies being printed thereafter from that job set of documents. Job recovery is a term of art generally referring to the actions which must be taken after a sheet feeding stoppage is detected, including but not limited to various situations in which a document feeder stops during a job input run due to a detected sheet jam or other cause. Job recovery typically involves instructing the machine operator on an electronic display panel how and where to reload and refeed documents to be recopied, such as which documents, from which locations in the document feeding path, and in what page or sheet order or reorder.

Conventionally, in the event of a DH failure or jam requiring a shutdown before the entire document set is fully scanned, the operator may be required for job recovery to manually return certain of the document sheets back to the original stack in the input tray, and correctly manually sequence or restack them, including reordering side one or side two sheet orientation in the case of a duplex document handler handling duplex documents. The DH may also then be required to feed and count through the original stack until the jammed sheet position is reached for the second time before copying resumes.

If the operator has correctly fully returned the set to its original configuration, including all the sheets recovered from the various parts of the document path, and the copying correctly restarts only after the last fully copied document page, the job may be correctly recovered. However, the document reordering process is sometimes confusing, subject to operator error, time consuming, etc. Job recovery can be quite complicated, especially if duplex or two sided documents (requiring inversion) were being imaged or copied. Complicated job recoveries require complex or even plural and/or sequential display instructions to the operator for job recovery, especially if documents stopped in different document path locations must be treated differently for job recovery. Noted thereon is Xerox Corporation U.S. Pat. No. 4,786,041 issued Nov. 22, 1988 to T. Acquaviva, and other art cited therein. Also noted regarding job recovery systems in reproduction machines are Xerox Corporation U.S. Pat. No. 4,338,023 issued Jul. 6, 1982, U.S. Pat. No. 5,148,286 issued Sep. 15, 1992, 5,107,299 issued Apr. 12, 1992, and pending U.S. application Ser. No. 08/150,327 filed Nov. 9, 1993. Copier microprocessor software programmed controllers in which such systems are typically implemented are described in many patents such as Xerox Corporation U.S. Pat. No. 4,475,156 issued Oct. 2, 1984 and art cited therein.

Sheet jam or misfeed avoidance and proper recovery therefrom is important to any document handler or reproduction device, but is especially important for remote scanners, fax or multifunction machines, where the output (printed copies) cannot be checked for errors because it is not at the same location as the image input. If job recovery is not done fully correctly, it will result in electronic storage and/or transmission of an uncollated, missing page or duplicate pages document set, causing incorrect, scrambled or uncollated copies to be printed thereafter from that job set of documents at all printing locations. If the printing is remote, and at multiple sites or addresses, job recovery errors may not be detected until after an entire print run at all the print locations. With bound sets, the bound defective print runs must be destroyed. The disclosed embodiment is thus particularly advantageous for more reliably automatically feeding and imaging simplex and duplex document sheets to be electronically imaged from one or both sides in a digital copier, scanner, and/or facsimile machine (or multimode combined such machines) in correct serial page order.

In contrast to such prior requirements for complex manual reordering of the originals, in this disclosed system the operator can simply be instructed only to commonly replace in one location those few originals that are actually found in the DH paper path at the time the stoppage occurs.

The disclosed embodiment is particularly advantageous for more reliably automatically feeding and imaging simplex and duplex document sheets to be electronically imaged from one or both sides in a digital copier, scanner, and/or facsimile machine (or multimode combined such machines) in correctly stored serial page order, with a compact, simple and low cost but reliable document feeding apparatus.

The disclosed exemplary system involves recognizing those originals (documents) which have already been scanned in, by a duplicate images detection system, to greatly simplify manual document set reordering (job recovery) for rescanning. With the disclosed capability of automatic electronic detection of duplicate (accidentally rescanned) pages, not only is much simpler operator reloading of stopped or jammed pages from the DH paper path possible, but the system can also then properly automatically reorder or ignore duplicate scanned in electronic pages. However, it is also highly desirable to provide such a system which does not require full page image comparisons, which would require buffer memory of several megabytes and additional memory and computer computation time for electronic retrieval and comparison of full images of pages. This later problem is also overcome here.

In a light lens copier the simplified system disclosed herein would not be possible since there is no way of knowing which of the documents replaced in the DH input have already been fully scanned other than manual handling and inspection or throwing away all copies and starting over with reloading all originals to be inputted. However, the subject system and method allows quick and inexpensive automatic page image duplication and elimination in a digital document imaging system. As disclosed, this can be done by an electronically efficient image identification, description and/or comparison system, as disclosed herein, or otherwise, of each document page (or document side, in the case of duplex documents) as or after it is scanned, and thereafter that page image can be recognized as having already been scanned during the recovery process, to eliminate duplication and provide greatly simplified job recovery.

The cited and other references, besides describing job recovery systems, also show various well known document and/or copy sheet jam detection and signaling or operator display systems, and thus those need not be described in detail herein. Jam detection systems typically involve detecting the failure of a moving sheet lead and/or trail edge to pass a sheet edge detector or sensor, or pass between sensors, within an allotted or allowed time period or time window. Examples of such paper path sensors are schematically illustrated in the document handler example herein conventionally connecting to a conventional controller, which has that capability. Reference is made to commonly assigned U.S. Pat. No. 5,339,139 issued Aug. 16, 1994 with regard to further details of this exemplary embodiment herein of a document handler for automatically feeding and imaging documents for electronic document imaging, and further art and information on said technology in general. The disclosed systems and methods are not limited to that particular document handler example, and are usable with various document imaging systems. They are not limited to any particular type of document handler, jam detection or signaling system, and not limited to sheet feeding jams, and can include interruption of document feeding or imaging during document set or job feeding for any reason, even machine power or logic interruptions.

More specifically, features disclosed in the specific embodiment herein include a multipage collated document digital electronic reproduction method in which document pages are scanned and imaged as page images of digital pixels, the improvement comprising a checksum method of automatically detecting duplicate document page scans by detecting duplicate electronic page images without substantial electronic data storage requirements by dividing a scanned electronic page image into multiple cell areas and counting pixels in the respective cell areas, storing said respective cell pixel counts and then comparing said respective cell pixel counts of one said scanned electronic page image with another said scanned electronic page image to automatically detect a duplicate document page scan where said respective cell pixel counts are substantially equal.

Other disclosed features are to provide a digital imaging method in which a plurality of document sheets are sequentially fed into a document feeding path from a document input to an electronic imaging station and digitally electronically imaged in electronic pixels, and then fed out from said electronic imaging station, and wherein sheet feeding stoppage in said document feeding path may be detected and signaled, the improvement comprising a simplified job recovery method including generating and storing electronic indicia indicative of said digital electronic images of documents which have been fed into said document feeding path to said electronic imaging station and electronically imaged prior to a said detected and signaled sheet feeding stoppage; in response to a said sheet feeding stoppage signal, removing said document sheets from said document feeding path and reloading said removed document sheets into said document input irrespective of whether or not said removed document sheets have already been electronically imaged; refeeding said removed document sheets in said document feeding path from said document input to said electronic imaging station to be electronically imaged; generating subsequent electronic indicia indicative of said subsequent electronic images of said removed documents which have been refed in said document feeding path to said electronic imaging station and electronically imaged after said sheet feeding stoppage signal; automatically electronically comparing said generated and stored electronic indicia of said electronic images prior to said sheet feeding stoppage signal with said subsequently generated electronic indicia indicative of said subsequent electronic images of said removed documents imaged after said sheet feeding stoppage signal, to detect duplicate digital electronic document page images; and providing duplicate electronic image removal signals for the automatic deletion of duplicate electronic images in response to said electronic comparison of said electronic indicia of said electronic images.

Further disclosed features of the exemplary embodiment herein include, individually or in combination a document handling and digital imaging system for sequentially feeding plural document sheets in a document feeding path from a document input to an electronic imaging station to be digitally electronically imaged in electronic pixels as document page images and fed out from said electronic imaging station after said electronic imaging, with a system for detecting document sheet feeding stoppages in said document feeding path, the improvement comprising a simplified job recovery system including a system for generating and storing electronic indicia indicative of said digital electronic page images of said documents which have been fed in said document feeding path to said electronic imaging station and electronically imaged; an operator display instructing the operator in response to a said detected sheet feeding stoppage in said document feeding path to remove document sheets from said document feeding path and reload said removed document sheets into said document input even if said removed document sheets have been electronically imaged, for refeeding said removed document sheets in said document feeding path from said document input to said electronic imaging station to be electronically imaged; said system for generating and storing electronic indicia indicative of said digital document page images further electronically generating and storing subsequent electronic indicia indicative of said subsequent digital electronic page images of said removed documents which have been refed in said document feeding path to said electronic imaging station; and a duplicate electronic document image detection system electronically connecting with said system for generating and storing electronic indicia indicative of said digital electronic images for automatically comparing said previously stored electronic indicia indicative of said previous digital electronically images of said documents prior to said detected sheet feeding stoppage with said subsequent digital electronically images of said removed documents which have been refed in said document feeding path to said electronic imaging station, to detect duplicate digital electronic images and to provide a duplicate electronic images signal for the automatic deletion of duplicate electronic document page images, and/or wherein said system for generating and storing electronic indicia indicative of said digital electronic images of said documents which have been fed to said electronic imaging station comprises a pixel summing system to provide distinctive said electronic indicia indicative of respective said digital document images which are different from one another for different document sheets; and/or wherein said system for generating and storing electronic indicia indicative of said digital electronic images of said documents which have been fed to said electronic imaging station comprises a pixel addition system in which the number of pixels in multiple defined cell areas of a said page image are respectively totaled and the least significant figures are deleted to provide distinctive numerical said electronic indicia indicative of respective said digital document images without substantial electronic data storage requirements; and/or in which least significant digits of said respective cell pixel counts are rounded off before said comparing of said respective cell pixel counts of one said scanned electronic page image with another said scanned electronic page image; and/or wherein said automatic electronic comparing of said electronic indicia of said electronic images to detect duplicate digital electronic images comprises a pixel summing system providing distinctive said electronic indicia indicative of respective said digital electronic document images which are different from one another; and/or wherein in said pixel summing the least significant figures of pixel gray scale are deleted and the remaining pixel gray scales are added for the document electronically imaged to provide a distinctive numerical said electronic indicia indicative of said electronic image without substantial electronic data storage.

Further by way of background there is noted other patent art on CVT duplex (both sides imaged) document handlers specifically for electronic (digital) imaging with a raster input scanner (RIS). A RIS may be either of the full width array (FWA) type, or a smaller RIS CCD array or chip with lens image reduction. Scanners may be separate units, or may be an element of a digital copier if scanning and printing are done on an integral or modular unit at the same location. Patents on duplex document handlers specifically for RIS or other scanners (otherwise known as "electronic front ends", or EFE's) particularly include Xerox Corp. U.S. Pat. No. 4,536,077 issued Aug. 20, 1985 to James C. Stoffel. Also, a Xerox Disclosure Journal (XDJ) publication dated May/June 1983 by Richard E. Smith, Vol. 8, No. 3, p. 263. Also, Xerox Corp. U.S. Pat. No. 4,673,285 issued 1987 to Shogren; and Mead Corp. Davis et al, U.S. Pat. No. 4,429,333. Also noted is U.S. Pat. No. 4,571,636, assigned to Fuji Xerox, and Eastman Kodak U.S. Pat. No. 5,298,937.

Further by way of background, it is known that combined facsimile and/or digital scanning for copying and printing or disk storage can be provided in a single unit, which may be encompassed by the term "printer", and are known as "multifunction", "multimode" or "combo" machines. Some examples are in Xerox Corporation U.S. Pat. Nos. 3,597,071 and 4,947,345 and Fuji Xerox Co. U.S. Pat. Nos. 5,038,218; and U.S. Pat. No. 5,012,892.

By way of general background, as scanners, printers, copiers and/or plural-mode integral such devices or systems increase in speed, and become more automatic, it is increasingly important to provide higher speed yet more reliable and more automatic handling of the document sheets being imaged and/or copied, i.e. the document input. It is desirable to reliably feed and register document sheets sequentially, which may present a variety or mixture of sizes, types, weights, thickness, materials, conditions and susceptibility to damage. "Originals" are often previous copies. Documents may have curls, wrinkles, tears, "dog-ears", cut-outs, overlays, tape, paste-ups, punched holes, staples, adhesive or slippery areas, or other irregularities. Yet, it is very desirable to provide minimal misfeeding, and minimal document jamming, wear or damage. Original document handling, particularly for delicate, valuable, thick or irregular documents, is often more difficult and critical than feeding blank or virgin copy sheets. Documents may have typing, smearable inks, freshly printed ink jet printer output, fuser oil or other materials thereon susceptible of smearing or contamination of other documents or machine components by the sheet separation and feeding process. The image materials (and/or its fusing), can change the sheet feeding characteristics.

Document handlers may be operated and controlled with known control systems and document positional sensors. It is well known and preferable to program and execute such control functions and logic with conventional software instructions for conventional microprocessors. Examples are in patents cited herein. Such software may of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems.

In the description herein the term "document" or "sheet"0 refers to a usually flimsy sheet of paper, plastic, or other such conventional individual image substrate, and not to microfilm or electronic images which are generally much easier to manipulate. The "document" is the sheet (original or previous copy) being imaged. A "simplex" document (or copy sheet) is one having its image and page number on only one side or face of the sheet, whereas a "duplex" document (or copy sheet) has "pages", and normally page images, on both sides, i.e., each duplex document is considered to have two opposing sides, faces, or "pages" even though no physical page number may be present.

As to specific hardware components of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description, including the drawing figure wherein:

FIG. 1 is a partially schematic front view of one embodiment of an exemplary compact document handling system for feeding and electronically scanning a set of documents with an exemplary document feeding system and a block diagram of an exemplary electronic duplicate scanned images detection system.

Describing now in further detail the exemplary embodiment with reference to the Figure, there is shown in FIG. 1 an exemplary document handler and digital imaging system 10 providing the advantageous features noted above for an electronic copier and/or scanner like that of the above-cited U.S. Pat. No. 5,339,139.

This particular document handler and its feeders and feed path are merely one example, as the present system is usable with almost any document handler for an electronic imaging system. The exemplary document handling system 10 disclosed here includes a desirable small loop short document path. It also provides "immediate" type duplex document inversion with the duplex sheet inverter chute compactly located over the top of the stack in the return or exit tray and under the input tray, i.e., utilizing the space between the two trays for inversion of duplex documents. This exemplary compact and lightweight document handler 10 may be a part of an optional or add-on top module 11 of a convertible digital copier/scanner unit (not fully shown). The document handler 10 is desirably pivotable along a pivot axis at the rear of the module 11, as is common and typical for document handlers, so as to expose a large (document size) imaging platen for the manual placement of documents stationarily thereon. Here, a platen 12 is provided with such a large platen portion 12a, which may be scanned by a rastor input scanner or RIS 14, also part of the module 11. The entire scanner or input module 11, including the platen 12 and the RIS 14 desirably may be a removable top module so that the underlying processor or printer unit may alternatively be used as a stand alone or remote digital printer for remote electronic input. With the top module 11, including the document handler 10, mounted on the digital printer unit, the integrated unit can provide a fully integrated convenience copier with automatic document feeding which even a casual operator may use simply by placing documents 18 in a document input tray 20 and automatically copying them at an imaging station 16 as if this were a normal light lens copier rather than a digital copier. Alternatively, the same document input at imaging station 16 (at platen portion 12a) provided here may also be easily used for facsimile transmissions. In that case the documents 18 will be similarly electronic imaged by RIS 14, but then transmitted over telephone lines or other communications media, with or without electronic storage or buffering. Only the relevant portions of the digital copier top module 11 and its document handler 10 need be illustrated here since the digital printer or copy processor on which it may be mounted may be any of various known, conventional, or new electronic printer units, which do not per se form part of this invention, and therefore need not be described.

The document handler 10 feeds documents to be imaged at a constant velocity with the CVT system past a scanning or slit image station 16 which is at the slit scanning platen portion 12b, as shown. For this document handler 10 document imaging, the RIS 14 is "parked" at this imaging station 16. Desirably, this movement of the RIS into the imaging station 16 position is merely a slight extension of the normal scanning travel of the RIS back and forth under the full size scanning platen portion 12a. That is, the RIS 14 is simply moved slightly further in the same plane beyond the end of the manual document placement position on platen portion 12a at one end thereof. Thus, the same RIS 14 movement drive and track or rails may be utilized at little or no increase in cost.

Turning now to one example of the novel system herein, simplifying of job recovery in this or any other digital scanner DH is provided here by greatly reducing manual reordering of document sheets for job recovery after a DH stoppage or jam. It allows simply reloading and refeeding all the document sheets recovered from the DH document feeding path after the DH is stopped, as by a jam detection. Then, during the document refeeding, there is automatic electronic detecting and eliminating of any rescans (image duplications of a previous scanned document successfully scanned in before the jam). This is done automatically, yet without requiring full image comparisons, by using a much simpler, low data rate, and lower bit usage, imaged page comparison method. One example of such a duplicate images detection system which may be used is a "check-sum of their pixels" system, or a "check-sum", as will be discussed further herein. "Check-sum of the bits" systems per se are known in prior computer systems products, like UNIX, for different applications.

In the present system, when a jam occurs in the DH paper path, the operator is instructed by the display to simply manually return to the input tray all originals that lie or are caught in the document path at that time (not those documents already fully ejected into the output tray, or not yet fed from the input tray), in the same order in which they are found in the document path. All these document sheets, including questionably previously imaged sheets, are all reloaded and rescanned, and their images are each compared electronically to the previous images scanned in. If a scanned image has not been previously fully scanned, that page image will be processed in the normal manner. However, duplicate images (rescans of the same page) are automatically electronically detected and automatically eliminated. The same process may be used in duplex mode as for simplex except that each side of the documents may be scanned and compared, i.e. both page images thereof. This job recovery is much simpler since no manual document reordering has to take place. DH and document wear is also minimized since the previously scanned and ejected originals in the output tray need not be reloaded and rescanned.

As noted, a smart jam recovery process such as this is important to any document handler, but is especially valuable for remote scanners or fax and multifunction machines, where the output (printed copies) cannot be checked for errors because it is normally not at the same location as the image input. This disclosed job recovery system makes maintaining correct page sequencing after job recovery much more likely. It also reduces the chances of duplicate or missed (unscanned) documents. It minimizes operator confusion, decreases jam recovery time, and reduces excess wear by eliminating needless DH cycling.

Further as to the image comparison and duplicate image removal method here, as noted, it may efficiently utilize principles of an electronic memory "checksum" to avoid much more memory and time consuming full image comparisons. In FIG. 1, there is shown here as electrically connected to the scanned image signals output of the RIS 14, by way of example, an image processor 102 in parallel with a duplicate image detector 104 with a loop from that back to the image processor 102, a document images storage 106 connected to the output of image processor 102, and a jam clearance and job recovery instructions and display 108 connecting to the output of the duplicate image detector 104 and also connecting to the existing controller 100.

As each document is scanned, a running sum may be kept of the pixel values in defined areas of the page image. This may be a "checksum" count with black equal to one and white equal to zero, or a pixel gray scale count. The page image is preferably electronically divided for this purpose by a fixed grid overlay or checkerboard pattern dividing the page image into multiple small zones, cells or areas in which the pixels are separately counted. E.g., 2 cm by 2 cm cells. The system can start counting pixels from one registration corner, incoming or buffered, and count the pixels in that cell over to the next cell line.

It is statistically unlikely for two scanned sheets to exhibit the exact same bit checksum levels in all of the cell areas of one page vs another page, as scanned by a quality scanner, even with some count roundoff in each cell, unless they were scanned from the same original page. Thus, if the same sums are found in each compared cell, a duplicate page image may be presumed to have been made during job recovery, and it may simply be eliminated. I.e., not stored with the electronically stored job. That is, during the job recovery, the stored sums can be compared to the newly scanned sums, page by page, to check for a match or not. Yet this cell by cell count comparison is clearly far more efficient than a full image or pixel by pixel page image comparison.

The finer or smaller the cells, the more accurate the comparison can be. Obviously, only partially scanned in (interrupted) page images will have a very different total pixel count, but very similar pages fully scanned in may have similar pixel counts if less significant digits are rounded off if a single pixel count were made of the entire page, rather than multiple cells of smaller areas. By using multiple separate checksums of separate areas of the page, as here, duplicate images of even similar pages may be detected. That is, the roundoff is less critical and have less effect on accuracy due the the smaller numbers of pixels in these smaller areas. Some roundoff of the least significant bits count is needed, since in practice, a small variant range should be allowed in the comparison to allow for differences in document registration and/or to reduce storage requirements and to decrease sensitivity to noise.

These cell checksum totals for each page scanned in may be stored until that job is completed, or stored with the image data of that page and carried with it. That is, the pixel check sums or other unique electronic indicia here which is corresponding to, but are not, a fully electronically scanned in document page, need only be stored temporarily, until that particular entire job or document set has been fed in and scanned in. I.e, the pixel counts of each page may be deleted after the end of that particular run of the DH has ended by feeding all of the documents from the input tray to the output tray. The feeding in of the last document of the job set is conventionally detectable by detecting that no more sheets are passing the input path sensor(s). However, if desired, that unique electronic indicia count number or other unique page identifier(s) may be saved and stored. E.g., it may be added to the page description language (PDL) properties of that page which are electronically associated with the actual page digital image and which may be stored and transmitted therewith, and used for other purposes. E.g., it could also be used as one simple indication of the page image area and density vs the skipable "white spaces" of that page, and thus used for estimates of that particular page's data storage and transmission time requirements, etc. For another example, Xerox Corporation U.S. application Ser. No. 08/062,971 filed May 17, 1993 (D/93150) by Keith Gilliland, et al, describes toner usage sensing or prediction utilizing pixel counting, and cites prior patents thereon, such as U.S. Pat. Nos. 5,204,699; 5,204,698; 4,847,659, etc. These various functions can be desirably combined and share electronics.

The detected duplicate (rescanned) page image can be automatically deleted from the imaging buffer storage, either immediately, before data compression, or after the page image has been compressed and stored, as by deleting its address track address from its disk storage.

Turning now to further details of the exemplary DH and scanning system 10, as disclosed further in the above cross-referenced applications, in the disclosed CVT (document constant velocity transport) system, all CVT document feeding rollers, 46, 47 and 48, may be commonly driven by the same motor, such as servo motor M2, at the same speed, while the document is being imaged. The CVT roller 47 here may have four separate cylindrical sections or concentric a common shaft 68 to provide the single drive-on-glass CVT roll 47. E.g., two elastomeric frictional feeding about 22 mm, versus about 21 mm for the other CVT roll 47 surfaces. Those other, only slightly smaller diameter surfaces do not provide any significant sheet feeding force, but provide document holddown or flattening of the entire document sheet to within the depth of field of the imaging system 14. They can also provide imaging background surfaces Wing shaped baffles may be provided instead.

The two elastomer feeding roll surfaces are spaced axially along shaft 68 so as to both be within the width of the narrowest document sheet to be fed, e.g., less than 20 cm apart, yet spaced far enough apart to ensure two distinctly spaced contact areas with every document. This spacing ensures an adequate degree of skew control as the document sheet is driven across the platen glass 12b in spite of whatever flatness or straightness tolerances are encountered in the platen glass 12b or the roll 47 shaft 68.

A further feature disclosed for this exemplary DH is that the same RIS 14 may be utilized for scanning documents manually placed on the platen portion 12a as well as documents which are automatically fed to be imaged on platen portion 12b' by the document handler 10. This is provided here by a two part platen 12 comprising a full size scanning platen portion 12a and a narrow slit scanning portion 12b. As may be seen, these two platen portions 12a and 12b are preferably closely adjacent one another and in the same plane and utilize the same frame mounting and/or alignment system. The two document trays 20, 22 may thus also primarily overlay the platen portion 12a rather than extend the machine footprint. While the two portions 12a and 12b of the platen could be monolithic or integral, they are preferably in two parts.

Documents 18 may be loaded face up in normal order in the document input tray 20 of the document handler 10 when automatic document input is desired. The stack of documents is then sequentially fed from the input tray 20 through a short, highly compact, "U" shaped document path 24 for imaging at the imaging station 16, and then after one imaging the simplex documents are fed directly on to a document output tray 22 in which the documents are restacked face down. However, as will be described, there is a partial difference in the document paths provided for simplex documents as compared to duplex documents. This is illustrated here by solid arrows representing the simplex document path 25 and dashed line arrows representing the duplex path 26. Note, however, that both simplex and duplex documents are ejected and restacked in the same document output tray 22 here, in the same manner, after their copying is completed.

The document input tray 20 here is closely superimposed above the document output tray 22. That is, these two trays closely overly one another to form a relatively enclosed space between the two trays. Yet, both trays are readily operator accessible. This space between the two trays 20 and 22 provides a protective and space saving inverter chute for duplex documents which are being inverted between the copying of their first and second sides.

Note that the U-shaped document path 24 contains a single natural inversion for turning each document sheet over once between its infeeding from input tray 20 and the imaging station 16. This is the only inversion in this document path 24. And there is no inversion in the duplex path 27 added portions. The document path 24 is like a "U" lying on its side, facing and connecting with the input tray 20 and output tray 22 at the upper and lower ends of the "U", and with the imaging station 16 on the bottom side of the "U" It may also be seen that the duplex document path 27 utilizes the same U-shaped document path 24 shared by both simplex and duplex documents, but additionally provides a short duplex documents return path from the output end of the U-shaped document path 24 back to the input of that path 24, as will be further described.

All of the document sheet feeding in the document path 24, including the duplex document path 27 portions, and the imaging station 16, are all provided in this example by only two drive motors, a first drive motor M1 and a second drive motor M2, which may be respectively connected to the various document path sheet feeders as illustrated by the illustrated connecting dashed lines. Both of the drive motors M1 and M2, solenoid 72, and a solenoid 28 (for selectively lifting the nudger roll of the input feeder), and any clutches, are controlled by a controller 100, which may be of the type known in the prior art previously noted above. Also connecting with the controller 100 in a conventional manner are sheet path sensors for detecting the lead and/or trail edge of document sheets being fed through the document path 24, 27 such as the illustrated sensors 31, 32, 33, and 34. Thus, these sheet path sensors provide signals to the controller as to the present document position, when the respective sensor is activated, and because the document sheet is moving at a known speed, its position can be predicted in advance by simple timing in the controller in a known manner.

The solenoid 28 is connected to that portion of a top sheet separator/feeder 30 which sequentially feeds the top sheet of the stack of documents loaded in the input tray 20 into the U shaped document path 24, and separates each fed sheet from the respective underlying sheets. The sheet separator/feeder 30 may be driven by the motor M1, as shown. There is preferably provided in this separator feeder 30 a nudger roll 36 which is cyclicly lowered by solenoid 28 onto the top of the stack for feeding or advancing the top sheet or sheets 18 into a positive retard separating nip. Here, the retard nip comprises a driven first feed roll 37 and an undriven retard roll 38. The driven feed roll 37 rotates to feed the top-most sheet at that point in time downstream into the document path 24, while subsequent or underlying sheets are retarded by the frictional retard roll 38 forming a nip therewith. Roller 38 downstream rotation is resisted by a spring 39, which spring 39 is wound up by roller 38 downstream rotation due to the high friction between rollers 37 and 38 when they are directly engaged (with no sheets therebetween). Whenever two or more sheets are in the retard nip between the rolls 37 and 38, the wound-up return spring 39 force is strong enough to overcome the (lesser) friction between the plural sheets in the nip, to push back upstream the underlying sheets, providing improved separation as further explained in the above-cited references.

Once a top sheet has been separated and fed into the document path 24 as described above, it then enters the regular document path sheet drive system 40. This will be described here with reference to the driven rollers, although the mating and nip-defining idler rollers are also illustrated. As shown, these document path sheet drive rollers of this example comprise, in order: second or take-away rolls 42, registration rollers 44 downstream thereof, (optionally with an intermediate sheet deskew buckle chamber therebetween), then first CVT rolls 46, then an imaging station 16 with the overlying sheet holddown CVT roller 47, then third CVT rolls 48, and then (after passing a pivotal gate 49) reversible exit nip rolls 50 at the entrance to the output tray 22. Note that the latter sheet path drive rollers (46, 47, 48, and 50) are illustrated as all driven by the motor M2, which is preferably a servo-motor for controlled driving of these rolls and particularly to provide the accurate constant velocity desired for imaging for the CVT rolls 46, 47 and 48. This drive M2 may (optionally) be shared if no sheets are in the CVT nips at times when rollers 50 are reversed, or if an electromechanical clutch allows feeding of long sheets (14–17 inches) with roller 50 reversal, as by M1 driving a reversing gear clutched to roller 50 with M2 disengaged. Or, a separate motor may be provided for rollers 50.

The illustrated imaging station CVT roller 47 may be gravity or spring loaded against the platen, and may also provide, or be associated with, an imaging background surface for appropriate image background for the document being imaged at that point. It provides the control of the document being imaged to maintain all of document within the depth of field and focus of the imaging system as the document passes through the imaging station, i.e., to maintain a uniform restricted (very narrow height) maximum spacing gap above the imaging plane at the platen upper surface, of, e.g., less than 0.5 mm.

Center registration and feeding of all documents can be conventionally provided by a well-known dual rack and pinion connection of the side-guides of the document input tray 20, so that the side guides automatically move together to always center the document stack irrespective of the size of the loaded documents.

For another optional feature, for selectably enlarging certain original documents into enlarged copies on larger copy sheets, and/or enlarged partial images, without losing image resolution, it may be desirable to scan the document more finely by moving the document more slowly relative to the RIS 14. Thus, switching to a slower CVT document drive velocity may be optionally provided, e.g., one-half speed.

The gate 49 is located at the downstream end of the U-shaped document path 24, just upstream of the reversible exit nip rolls 50 and at the entrance of the duplex document path 27. The gate 49 does not obstruct documents coming from the imaging station 16, irrespective of whether they are duplex or simplex documents.

All documents here go directly past the imaging station 16 into the nip of the exit rolls 50. Simplex documents are fed on by these rolls 50 without any reversal thereof out into the exit tray 22 for restacking there in proper collated page order. That is, stacking face down in 1 to N order, if the documents were fed face up in 1 to N order from the input tray 20 and were inverted once in the U-shaped document path 24.

However, for duplex documents which have been imaged on their first side and are yet to be imaged on their second side, as soon as the trail edge of the duplex document passes the sensor 34, the controller 100 directs the reversal of the exit rolls 50. The duplex document sheet at that point is extending substantially (for most of its length) out into the above-described inverter chute space between the trays 20 and 22. That duplex document sheet is now rapidly reversed (25, 26) (feeding much faster than the CVT velocity) to be drawn back into the document handler toward the gate 49 by reversing rollers 50 at that point. The gate 49 is either solenoid or cam actuated or gravity loaded at this point into a position in which, as shown in phantom, the reversed duplex document is directed up into the duplex path 27. This duplex path 27 forms a return path of the duplex documents into the entrance of the U-shaped path 24, as previously noted.

The combined duplex documents path 24, 27 provides a complete loop, as may be seen. This complete duplexing loop 24, 27 is quite small and compact. Desirably, it has dimensions only slightly larger than that of the longest document dimension to be fed therethrough. That is, this system is operative as long as the trail edge of the duplex document being inverted clears the sensor 34 before the lead edge of that same document sheet returns to the sensor 34 through the loop path 27, 24 after having its second side imaged at the imaging station 16. The duplex loop path length is preferably long enough for a U.S. standard 17 inch (approximately 43 cm.) duplex document to be fed short edge first. I.e., so that the head of the 17" or other longest document to be imaged doesn't hit the pre-exit sensor 34 until the tail of that long document clears that sensor 34.

This refeeding of duplex document sheets through the path 24 for second side imaging turns those document sheets over a second time. For proper collated output into the output tray 22, the duplex documents may be re-inverted before restacking by being again fed back through the same path 27, 24 in the same manner, utilizing the same reversal of the exit rolls 50, but passing through without imaging, and then ejected (by not reversing the exit rolls 50). Thus, the duplex document is then ejected, properly oriented face down, into the output tray 22. Face down output for duplex documents is, of course, with the first or odd side page down, since this is a 1 to N system.

The platen 12 here is preferably in two separate portions, 12a and 12b. There is also provided here a platen gap 54 by a beveled platen edge 56 on the main or full size platen portion 12a end facing 12b, as shown. This provides a space or groove extending below the upper surface of the platen portion 12b into which a baffle lip or catch 52 may be desirably placed or fastened. Thus, the lead edge of all documents fed through the imaging station 16 over the platen 12b upper surface are positively caught and deflected upwardly into the next feed nip.

The exemplary RIS 14 here may be, e.g., a diode type full width array of a conventional type for high resolution, scanning closely under the platen. It may use the well known integral fiber optic "selfoc" lenses. As noted, here the same RIS 14 may be "parked" for CVT input at an imaging station 16 which may be at one end of a single linear scan track which is only a slight extension of the same scan path used for the main platen 12a scanning system, thus saving space and minimizing components.

It will be noted that the document path here does not need to have any active document side registration (transverse the feed direction), even before second side imaging, because any lateral misregistration may be digitally corrected. That is a generally known technique, e.g., detecting the side edges of the document and counting the pixels of the full width scanner 14 array outside the document sheet edge area. Some examples of document edge detection and skew correction are in, and in references cited in, Xerox Corporation U.S. Pat. Nos. 5,355,420 issued Oct. 11, 1994; 5,091,654 issued Feb. 25, 1992; and 4,864,415. Document edge detection can be enhanced by use of a spectral (mirror), superwhite, black, colored or other non-white image scanning background, e.g., on the surface of roller 47, and/or an associated baffle, at least in those areas in which document edges are being detected.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a document handling and digital imaging system for sequentially feeding plural document sheets in a document feeding path from a document input to an electronic imaging station to be digitally electronically imaged in electronic pixels as document page images and fed out from said electronic imaging station after said electronic imaging, with a system for detecting document sheet feeding stoppages in said document feeding path, the improvement comprising a simplified job recovery system including:

a system for generating and storing electronic indicia indicative of said digital electronic page images of said documents which have been fed in said document feeding path to said electronic imaging station and electronically imaged;

an operator display instructing the operator in response to a said detected sheet feeding stoppage in said document feeding path to remove document sheets from said document feeding path and reload said removed document sheets into said document input even if said removed document sheets have been electronically imaged, for refeeding said removed document sheets in said document feeding path from said document input to said electronic imaging station to be electronically imaged;

said system for generating and storing electronic indicia indicative of said digital document page images further electronically generating and storing subsequent electronic indicia indicative of said subsequent digital electronic page images of said removed documents which have been refed in said document feeding path to said electronic imaging station;

and a duplicate electronic document image detection system electronically connecting with said system for generating and storing electronic indicia indicative of said digital electronic images for automatically comparing previously stored electronic indicia indicative of said previous digital electronic images of said documents prior to said detected sheet feeding stoppage with said subsequent digital electronic images of said removed documents which have been refed in said document feeding path to said electronic imaging station, to detect duplicate digital electronic images and to provide a duplicate electronic images signal for the automatic deletion of duplicate electronic document page images.

2. The document handling system of claim 1, wherein said system for generating and storing electronic indicia indicative of said digital electronic images of said documents which have been fed to said electronic imaging station comprises a pixel summing system to provide distinctive said electronic indicia indicative of respective said digital document images which are different from one another for different document sheets.

3. In a document handling and digital imaging system for sequentially feeding plural document sheets in a document feeding path from a document input to an electronic imaging station to be digitally electronically imaged in electronic pixels as document page images and fed out from said electronic imaging station after said electronic imaging, with a system for detecting document sheet feeding stoppages in said document feeding path, the improvement comprising a simplified job recovery system including:

a system for generating and storing electronic indicia indicative of said digital electronic page images of said documents which have been fed in said document feeding path to said electronic imaging station and electronically imaged;

an operator display instructing the operator in response to a said detected sheet feeding stoppage in said document feeding path to remove document sheets from said document feeding path and reload said removed document sheets into said document input even if said removed document sheets have been electronically imaged, for refeeding said removed document sheets in said document feeding path from said document input to said electronic imaging station to be electronically imaged;

said system for generating and storing electronic indicia indicative of said digital document page images further electronically generating and storing subsequent electronic indicia indicative of said subsequent digital electronic page images of said removed documents which have been refed in said document feeding path to said electronic imaging station;

and a duplicate electronic document image detection system electronically connecting with said system for generating and storing electronic indicia indicative of said digital electronic images for automatically comparing said previously stored electronic indicia indicative of said previous digital electronically images of said documents prior to said detected sheet feeding stoppage with said subsequent digital electronic images of said removed documents which have been refed in said document feeding path to said electronic imaging station, to detect duplicate digital electronic images and to provide a duplicate electronic images signal for the automatic deletion of duplicate electronic document page images;

wherein said system for generating and storing electronic indicia indicative of said digital electronic images of said documents which have been fed to said electronic imaging station comprises a pixel addition system in which the number of pixels in multiple defined cell areas of a said page image are respectively totaled and the least significant figures are deleted to provide electronic indicia indicative of respective said digital document images without substantial electronic data storage requirements.

4. In a digital imaging method in which a plurality of document sheets are sequentially fed into a document feeding path from a document input to an electronic imaging station and digitally electronically imaged in electronic pixels, and then fed out from said electronic imaging station, and wherein sheet feeding stoppage in said document feeding path may be detected and signaled, the improvement comprising a simplified job recovery method including:

generating and storing electronic indicia indicative of said digital electronic images of documents which have been fed into said document feeding path to said electronic imaging station and electronically imaged prior to a said detected and signaled sheet feeding stoppage;

in response to a said sheet feeding stoppage signal, removing said document sheets from said document feeding path and reloading said removed document sheets into said document input irrespective of whether or not said removed document sheets have already been electronically imaged;

refeeding said removed document sheets in said document feeding path from said document input to said electronic imaging station to be electronically imaged;

generating subsequent electronic indicia indicative of said subsequent electronic images of said removed documents which have been refed in said document feeding path to said electronic imaging station and electronically imaged after said sheet feeding stoppage signal;

and automatically electronically comparing said generated and stored electronic indicia of said electronic images prior to said sheet feeding stoppage signal with said subsequently generated electronic indicia indicative of said subsequent electronic images of said removed documents imaged after said sheet feeding stoppage signal, to detect duplicate digital electronic document page images;

and providing duplicate electronic image removal signals for the automatic deletion of duplicate electronic images in response to said electronic comparison of said electronic indicia of said electronic images.

5. The digital imaging method of claim 4, wherein said automatic electronic comparing of said electronic indicia of said electronic images to detect duplicate digital electronic images comprises a pixel summing system providing distinctive said electronic indicia indicative of respective said digital electronic document images which are different from one another.

6. In a digital imaging method in which a plurality of document sheets are sequentially fed into a document feeding path from a document input to an electronic imaging station and digitally electronically imaged in electronic pixels, and then fed out from said electronic imaging station, and wherein sheet feeding stoppage in said document feeding path may be detected and signaled, the improvement comprising a simplified job recovery method including:

generating and storing electronic indicia indicative of said digital electronic images of documents which have been fed into said document feeding path to said electronic imaging station and electronically imaged prior to a said detected and signaled sheet feeding stoppage;

in response to a said sheet feeding stoppage signal, removing said document sheets from said document feeding path and reloading said removed document sheets into said document input irrespective of whether or not said removed document sheets have already been electronically imaged;

refeeding said removed document sheets in said document feeding path from said document input to said electronic imaging station to be electronically imaged;

generating subsequent electronic indicia indicative of said subsequent electronic images of said removed documents which have been refed in said document feeding path to said electronic imaging station and electronically imaged after said sheet feeding stoppage signal;

and automatically electronically comparing said generated and stored electronic indicia of said electronic images prior to said sheet feeding stoppage signal with said subsequently generated electronic indicia indicative of said subsequent electronic images of said removed documents imaged after said sheet feeding stoppage signal, to detect duplicate digital electronic document page images;

and providing duplicate electronic image removal signals for the automatic deletion of duplicate electronic images in response to said electronic comparison of said electronic indicia of said electronic images;

wherein said automatic electronic comparing of said electronic indicia of said electronic images to detect duplicate digital electronic images comprises a pixel summing system providing distinctive said electronic indicia indicative of respective said digital electronic document images which are different from one another; and wherein in said pixel summing the least significant figures of pixel gray scale are deleted and the remaining pixel gray scales are added for the document electronically imaged to provide electronic indicia indicative of said electronic image without substantial electronic data storage.

* * * * *